(12) United States Patent
Parris

(10) Patent No.: US 8,682,123 B2
(45) Date of Patent: Mar. 25, 2014

(54) ADHESIVELY COUPLED OPTICAL FIBERS AND ENCLOSING TAPE

(75) Inventor: Don Parris, Newton, NC (US)

(73) Assignee: Draka Comteq, B.V., Amsterdam (NL)

( * ) Notice: Subject to any disclaimer, the term of this patent is extended or adjusted under 35 U.S.C. 154(b) by 321 days.

(21) Appl. No.: 13/181,762

(22) Filed: Jul. 13, 2011

(65) Prior Publication Data

US 2012/0014652 A1 Jan. 19, 2012

Related U.S. Application Data

(60) Provisional application No. 61/364,659, filed on Jul. 15, 2010.

(51) Int. Cl.
*G02B 6/44* (2006.01)

(52) U.S. Cl.
USPC .......................................................... 385/100

(58) Field of Classification Search
None
See application file for complete search history.

(56) References Cited

U.S. PATENT DOCUMENTS

| | | | |
|---|---|---|---|
| 4,113,349 A | 9/1978 | Stiles | |
| 4,211,591 A | 7/1980 | Stiles | |
| 4,232,935 A | 11/1980 | Rohner et al. | |
| 4,239,335 A | 12/1980 | Stiles | |
| 4,366,206 A | 12/1982 | Tanaka | |
| 4,600,407 A | 7/1986 | Huber | |
| 4,703,998 A | 11/1987 | Uchioke et al. | |
| 4,729,629 A | 3/1988 | Saito et al. | |
| 4,838,643 A | 6/1989 | Hodges et al. | |
| 4,873,143 A | 10/1989 | Tanaka | |
| 4,909,592 A | 3/1990 | Arroyo et al. | |
| 5,109,457 A | 4/1992 | Panuska et al. | |
| 5,138,685 A | 8/1992 | Arroyo et al. | |
| 5,157,752 A | 10/1992 | Greveling et al. | |
| 5,179,611 A | 1/1993 | Umeda et al. | |
| 5,246,770 A | 9/1993 | Bottiglione et al. | |
| 5,264,251 A | 11/1993 | Geursen et al. | |
| 5,271,081 A * | 12/1993 | Khalil ........................... | 385/112 |
| 5,278,217 A | 1/1994 | Umeda et al. | |
| 5,350,617 A | 9/1994 | Fujisawa et al. | |
| 5,369,720 A | 11/1994 | Parry et al. | |
| 5,574,816 A | 11/1996 | Yang et al. | |
| 5,589,256 A | 12/1996 | Hansen et al. | |

(Continued)

FOREIGN PATENT DOCUMENTS

| | | | |
|---|---|---|---|
| EP | 0373846 A2 | 6/1990 | |
| EP | 0482703 A1 | 4/1992 | |

(Continued)

OTHER PUBLICATIONS

Aquasol Corporation, Aquasolpaper, http://www.aquasolpapercom/characteristics, pp. 1-2, downloaded on Nov. 16, 2009.

(Continued)

*Primary Examiner* — Sung Pak
(74) *Attorney, Agent, or Firm* — Additon, Higgins, Pendleton & Ashe, P.A.

(57) ABSTRACT

The present invention relates to optical-fiber cables having a tape enclosing one or more optical fibers. A plurality of discrete deposits of adhesive material are typically used to couple the optical fibers to the enclosing tape. A buffer tube may enclose the optical fibers and the tape. The buffer tube typically has a buffer-tube adhesive filling coefficient of between about 0.001 and 0.05.

29 Claims, 5 Drawing Sheets

(56) References Cited

U.S. PATENT DOCUMENTS

| | | | |
|---|---|---|---|
| 5,630,003 A | 5/1997 | Arroyo | |
| 5,698,615 A * | 12/1997 | Polle | 523/173 |
| 5,717,805 A | 2/1998 | Stulpin | |
| 5,736,595 A | 4/1998 | Gunther et al. | |
| 5,761,362 A | 6/1998 | Yang et al. | |
| 5,906,952 A | 5/1999 | Everaere et al. | |
| 5,911,023 A | 6/1999 | Risch et al. | |
| 5,925,461 A | 7/1999 | Fairgrieve | |
| 5,982,968 A | 11/1999 | Stulpin | |
| 6,003,565 A | 12/1999 | Whittier, II et al. | |
| 6,035,087 A | 3/2000 | Bonicel et al. | |
| 6,051,317 A | 4/2000 | Brueggemann et al. | |
| 6,066,397 A | 5/2000 | Risch et al. | |
| 6,085,009 A | 7/2000 | Risch et al. | |
| 6,134,363 A | 10/2000 | Hinson et al. | |
| 6,151,434 A | 11/2000 | Bonicel | |
| 6,167,179 A | 12/2000 | Weiss et al. | |
| 6,167,180 A | 12/2000 | Keller | |
| 6,173,100 B1 | 1/2001 | Newton et al. | |
| 6,175,677 B1 | 1/2001 | Yang et al. | |
| 6,178,278 B1 | 1/2001 | Keller et al. | |
| 6,181,857 B1 | 1/2001 | Emeterio et al. | |
| 6,210,802 B1 | 4/2001 | Risch et al. | |
| 6,215,931 B1 | 4/2001 | Risch et al. | |
| 6,226,431 B1 | 5/2001 | Brown et al. | |
| 6,253,012 B1 | 6/2001 | Keller et al. | |
| 6,278,826 B1 | 8/2001 | Sheu | |
| 6,284,367 B1 | 9/2001 | Gruhn et al. | |
| 6,304,701 B1 | 10/2001 | Bringuier et al. | |
| 6,314,224 B1 | 11/2001 | Stevens et al. | |
| 6,321,012 B1 | 11/2001 | Shen | |
| 6,321,014 B1 | 11/2001 | Overton et al. | |
| 6,334,016 B1 | 12/2001 | Greer, IV | |
| 6,348,236 B1 | 2/2002 | Fairgrieve et al. | |
| 6,374,023 B1 | 4/2002 | Parris | |
| 6,381,390 B1 | 4/2002 | Hutton et al. | |
| 6,463,199 B1 | 10/2002 | Quinn et al. | |
| 6,493,491 B1 | 12/2002 | Shen et al. | |
| 6,501,887 B1 | 12/2002 | Bringuier et al. | |
| 6,504,979 B1 | 1/2003 | Norris et al. | |
| 6,504,980 B1 | 1/2003 | Gaillard et al. | |
| 6,574,400 B1 | 6/2003 | Lail | |
| 6,577,796 B2 | 6/2003 | Anelli et al. | |
| 6,603,908 B2 | 8/2003 | Dallas et al. | |
| 6,618,538 B2 | 9/2003 | Nechitailo et al. | |
| 6,631,229 B1 | 10/2003 | Norris et al. | |
| 6,633,709 B2 | 10/2003 | Van Vickle et al. | |
| 6,654,526 B2 | 11/2003 | Nechitailo et al. | |
| 6,658,184 B2 | 12/2003 | Bourget et al. | |
| 6,677,394 B1 | 1/2004 | Butterbach et al. | |
| 6,748,146 B2 | 6/2004 | Parris | |
| 6,749,446 B2 | 6/2004 | Nechitailo | |
| 6,757,465 B1 | 6/2004 | Yokokawa et al. | |
| 6,760,523 B2 | 7/2004 | Nechitailo | |
| 6,778,745 B2 | 8/2004 | Debban, Jr. et al. | |
| 6,847,768 B2 | 1/2005 | Lail et al. | |
| 6,899,776 B2 | 5/2005 | Bahlmann et al. | |
| 6,906,131 B2 | 6/2005 | Ahmed et al. | |
| 6,912,347 B2 | 6/2005 | Rossi et al. | |
| 6,922,515 B2 | 7/2005 | Nechitailo et al. | |
| 6,934,452 B2 | 8/2005 | Bocanegra et al. | |
| 6,941,049 B2 | 9/2005 | Risch et al. | |
| 6,970,629 B2 | 11/2005 | Lail et al. | |
| 7,006,740 B1 | 2/2006 | Parris | |
| 7,045,010 B2 | 5/2006 | Sturman, Jr. | |
| 7,087,842 B2 | 8/2006 | Belli et al. | |
| 7,162,128 B2 | 1/2007 | Lovie et al. | |
| 7,171,086 B2 | 1/2007 | Engel | |
| 7,177,507 B2 | 2/2007 | Parsons et al. | |
| 7,231,119 B2 | 6/2007 | Rhoney et al. | |
| 7,236,670 B2 | 6/2007 | Lail et al. | |
| 7,254,302 B2 | 8/2007 | Parsons et al. | |
| 7,254,303 B2 | 8/2007 | Parsons | |
| 7,277,615 B2 | 10/2007 | Greenwood et al. | |
| 7,322,122 B2 | 1/2008 | Overton et al. | |
| 7,336,873 B2 | 2/2008 | Lail et al. | |
| 7,346,244 B2 | 3/2008 | Gowan et al. | |
| 7,349,607 B2 | 3/2008 | Schneider et al. | |
| 7,356,234 B2 | 4/2008 | de Montmorillon et al. | |
| 7,397,992 B1 | 7/2008 | Blazer et al. | |
| 7,471,861 B2 | 12/2008 | Schneider et al. | |
| 7,483,613 B2 | 1/2009 | Bigot-Astruc et al. | |
| 7,515,795 B2 | 4/2009 | Overton et al. | |
| 7,526,177 B2 | 4/2009 | Matthijsse et al. | |
| 7,555,186 B2 | 6/2009 | Flammer et al. | |
| 7,567,739 B2 | 7/2009 | Overton et al. | |
| 7,570,852 B2 | 8/2009 | Nothofer et al. | |
| 7,574,095 B2 | 8/2009 | Lock et al. | |
| 7,587,111 B2 | 9/2009 | de Montmorillon et al. | |
| 7,599,589 B2 * | 10/2009 | Overton et al. | 385/100 |
| 7,623,747 B2 | 11/2009 | de Montmorillon et al. | |
| 7,630,605 B2 | 12/2009 | Bringuier et al. | |
| 7,639,915 B2 | 12/2009 | Parris et al. | |
| 7,646,952 B2 | 1/2010 | Parris | |
| 7,646,954 B2 | 1/2010 | Tatat | |
| 7,693,375 B2 | 4/2010 | Freeland et al. | |
| 7,702,204 B2 | 4/2010 | Gonnet et al. | |
| 7,724,998 B2 | 5/2010 | Parris et al. | |
| 7,817,891 B2 | 10/2010 | Lavenne et al. | |
| 7,889,960 B2 | 2/2011 | de Montmorillon et al. | |
| 7,970,247 B2 | 6/2011 | Barker | |
| 7,974,507 B2 | 7/2011 | Lovie et al. | |
| 2002/0126970 A1 | 9/2002 | Anderson et al. | |
| 2002/0154873 A1 | 10/2002 | Sheu | |
| 2003/0108310 A1 | 6/2003 | Nechitailo et al. | |
| 2003/0118301 A1 | 6/2003 | Hurley et al. | |
| 2004/0120663 A1 | 6/2004 | Lail et al. | |
| 2005/0180704 A1 | 8/2005 | Terry et al. | |
| 2005/0213902 A1 * | 9/2005 | Parsons | 385/102 |
| 2006/0165355 A1 | 7/2006 | Greenwood et al. | |
| 2007/0019915 A1 | 1/2007 | Overton et al. | |
| 2007/0098339 A1 | 5/2007 | Bringuier et al. | |
| 2007/0269172 A1 | 11/2007 | Parsons et al. | |
| 2007/0297730 A1 | 12/2007 | Bringuier et al. | |
| 2008/0056649 A1 | 3/2008 | Fulbright et al. | |
| 2008/0145010 A1 | 6/2008 | Overton et al. | |
| 2008/0176475 A1 | 7/2008 | Sahasrabudhe et al. | |
| 2008/0181564 A1 | 7/2008 | Overton et al. | |
| 2008/0274316 A1 | 11/2008 | Griffith et al. | |
| 2008/0292262 A1 | 11/2008 | Overton et al. | |
| 2008/0317410 A1 | 12/2008 | Griffioen et al. | |
| 2009/0175583 A1 | 7/2009 | Overton | |
| 2009/0190890 A1 | 7/2009 | Freeland et al. | |
| 2009/0214167 A1 | 8/2009 | Lookadoo et al. | |
| 2009/0252469 A1 | 10/2009 | Sillard et al. | |
| 2009/0279833 A1 | 11/2009 | Overton et al. | |
| 2009/0279835 A1 | 11/2009 | de Montmorillon et al. | |
| 2009/0297107 A1 | 12/2009 | Tatat | |
| 2010/0021170 A1 | 1/2010 | Lumineau et al. | |
| 2010/0028020 A1 | 2/2010 | Gholami et al. | |
| 2010/0092135 A1 | 4/2010 | Barker et al. | |
| 2010/0092138 A1 | 4/2010 | Overton | |
| 2010/0092139 A1 | 4/2010 | Overton | |
| 2010/0092140 A1 | 4/2010 | Overton | |
| 2010/0118388 A1 | 5/2010 | Pastouret et al. | |
| 2010/0119202 A1 | 5/2010 | Overton | |
| 2010/0135623 A1 | 6/2010 | Overton | |
| 2010/0135624 A1 | 6/2010 | Overton et al. | |
| 2010/0135625 A1 | 6/2010 | Overton | |
| 2010/0135627 A1 | 6/2010 | Pastouret et al. | |
| 2010/0142033 A1 | 6/2010 | Regnier et al. | |
| 2010/0142969 A1 | 6/2010 | Gholami et al. | |
| 2010/0150505 A1 | 6/2010 | Testu et al. | |
| 2010/0154479 A1 | 6/2010 | Milicevic et al. | |
| 2010/0166375 A1 | 7/2010 | Parris | |
| 2010/0171945 A1 | 7/2010 | Gholami et al. | |
| 2010/0183821 A1 | 7/2010 | Hartsuiker et al. | |
| 2010/0189397 A1 | 7/2010 | Richard et al. | |
| 2010/0189399 A1 | 7/2010 | Sillard et al. | |
| 2010/0189400 A1 | 7/2010 | Sillard et al. | |
| 2010/0202741 A1 | 8/2010 | Ryan et al. | |
| 2010/0214649 A1 | 8/2010 | Burov et al. | |
| 2010/0215328 A1 | 8/2010 | Tatat et al. | |
| 2010/0254653 A1 | 10/2010 | Molin et al. | |

(56) References Cited

U.S. PATENT DOCUMENTS

| | | |
|---|---|---|
| 2010/0310218 A1 | 12/2010 | Molin et al. |
| 2011/0026889 A1 | 2/2011 | Risch et al. |
| 2011/0044595 A1 | 2/2011 | Sillard et al. |
| 2011/0058781 A1 | 3/2011 | Molin et al. |
| 2011/0064367 A1 | 3/2011 | Molin et al. |
| 2011/0064371 A1 | 3/2011 | Leatherman et al. |
| 2011/0069724 A1 | 3/2011 | Richard et al. |
| 2011/0069932 A1 | 3/2011 | Overton et al. |
| 2011/0091171 A1 | 4/2011 | Tatat et al. |
| 2011/0116160 A1 | 5/2011 | Boivin et al. |
| 2011/0116753 A1 | 5/2011 | Overton et al. |
| 2011/0123161 A1 | 5/2011 | Molin et al. |
| 2011/0123162 A1 | 5/2011 | Molin et al. |
| 2011/0135262 A1 | 6/2011 | Molin et al. |
| 2011/0135263 A1 | 6/2011 | Molin et al. |
| 2011/0176782 A1 | 7/2011 | Parris |
| 2011/0188823 A1 | 8/2011 | Sillard et al. |
| 2011/0188826 A1 | 8/2011 | Sillard et al. |
| 2011/0217012 A1 | 9/2011 | Bigot-Astruc |
| 2011/0229101 A1 | 9/2011 | de Montmorillon |
| 2011/0268398 A1 | 11/2011 | Quinn et al. |
| 2011/0268400 A1 | 11/2011 | Lovie et al. |
| 2011/0287195 A1 | 11/2011 | Molin |
| 2012/0009358 A1 | 1/2012 | Gharbi et al. |
| 2012/0014652 A1 | 1/2012 | Parris |
| 2012/0051703 A1 | 3/2012 | Bigot-Astruc et al. |

FOREIGN PATENT DOCUMENTS

| | | |
|---|---|---|
| EP | 1298477 A2 | 9/2001 |
| EP | 1746447 A2 | 1/2007 |
| EP | 1746447 A2 | 2/2007 |
| EP | 01818704 A2 | 8/2007 |
| EP | 1921478 A1 | 5/2008 |
| EP | 2204681 A1 | 7/2010 |
| WO | 2008/066782 A2 | 6/2008 |
| WO | 2009/062131 A1 | 5/2009 |

OTHER PUBLICATIONS

U.S. Appl. No. 60/700,739, filed Jul. 20, 2005.
U.S. Appl. No. 60/710,654, filed Aug. 24, 2005.
U.S. Appl. No. 60/764,776, filed Feb. 3, 2006.
Verizon, "Verizon NEBS Compliance: Optical Fiber and Optical Fiber Cable," VZ.TPR.9430, Issue 4, (Apr. 2010) pp. 1-29.
Bluestar Silicones, "Silbione RTV-4410 A/B," product data sheet, www.bluestarsilicones.com, (Jun. 2007) pp. 1-2.
Commonly owned U.S. Appl. No. 60/887,373, filed Jan. 31, 2007.
Commonly owned U.S. Appl. No. 60/886,235, filed Jan. 23, 2007.

* cited by examiner

ADHESIVELY COUPLED OPTICAL FIBERS AND ENCLOSING TAPE

CROSS-REFERENCE TO PRIORITY APPLICATION

This application hereby claims the benefit of U.S. Patent Application No. 61/364,659 for Adhesively Coupled Optical Fibers and Enclosing Tape (filed Jul. 15, 2010), which is hereby incorporated by reference in its entirety.

FIELD OF THE INVENTION

The invention relates to optical-fiber cables having improved coupling.

BACKGROUND

Water-blocking in optical-fiber buffer tubes and fiber optic cables typically has been accomplished by using petroleum-based filling gels (e.g., grease). By completely filling all of the free space inside a buffer tube that contains an optical fiber or optical-fiber bundle, the filling gel blocks the ingress of water into the fiber optic cable.

Moreover, being a thixotropic material, the filling gel also tends to mechanically couple the optical fiber(s) to the buffer tube. Such mechanical coupling prevents the optical fiber(s) from retracting inside the buffer tube as the buffer tube is processed during manufacturing, as the cable is installed or otherwise handled in the field, or as the cable is subjected to thermally induced dimensional changes from environmental exposure.

Although relatively effective for controlling cable flooding, the petroleum-based filling gels are inconvenient during cable repair and optical-fiber splicing. The use of such gels requires cleaning the petroleum-based material from optical fibers prior to splicing (and sometimes from equipment and personnel, too), which can be messy and time consuming. Consequently, using conventional filling greases is often undesirable.

Various dry-cable designs have been developed to eliminate filling greases while providing some water-blocking and coupling functionality. In either loose-tube optical-fiber cables or ribbon cables, a totally dry design eliminates the filling gel from the enclosed buffer tubes. In a dry-cable design, for example, filling gel may be replaced by a water-blocking element, such as a tape or a yarn carrying a water-swellable material (e.g., water-swellable powder). Water-swellable powders are dry to the touch and, when bound to a carrier tape or yarn, can be readily removed during field operations (e.g., splicing).

One problem associated with dry-cable designs is that the optical fibers (e.g., optical-fiber ribbon) contained within the cable are often insufficiently coupled to the cable and/or buffer tube enclosing the optical fibers. In the absence of sufficient coupling, the optical fibers can undesirably bunch up inside the cable.

Accordingly, a need exists for an improved way of coupling optical fibers to buffer-tube and/or cable elements.

SUMMARY

Accordingly, in one aspect, the present invention embraces an optical-fiber cable having an enclosing tape (e.g., a perforated water-swellable tape) at least partially enclosing one or more optical fibers (e.g., a ribbon stack). A buffer tube substantially encloses the optical fibers and the enclosing tape. A plurality of discrete deposits of adhesive material (e.g., a curable silicone adhesive) couple the enclosing tape to the optical fibers. The plurality of discrete deposits of adhesive material may also couple the enclosing tape to the buffer tube. The buffer tube typically has a buffer-tube adhesive filling coefficient of between about 0.001 and 0.05 (e.g., between about 0.0015 and 0.005) measured over a buffer-tube length of 100 meters. The optical-fiber cable typically has an optical-fiber pullout force of at least about 0.1625 N/fiber in accordance with the Ribbon Pullout Test Procedure as set forth in the Verizon Technical Purchasing Requirements VZ.TPR.9430 (Issue 4, April 2010).

In another aspect, the present invention embraces a method for manufacturing an optical-fiber cable. A substantially uncured adhesive, typically a substantially uncured adhesive having a viscosity of between about 500 centipoise and 5000 centipoise (e.g., measured at application), is applied to one or more optical fibers or to an enclosing tape. The optical fibers are then at least partially enclosed with the enclosing tape. A molten polymeric tube is extruded around the optical fibers and the enclosing tape. The molten polymeric tube is cooled to form a buffer tube. The adhesive is cured; however, the adhesive typically does not finish curing until the molten polymeric tube solidifies. In some embodiments, at least a portion of the substantially uncured adhesive seeps entirely through the tape after being applied, thereby coupling the tape to the buffer tube.

The foregoing illustrative summary, as well as other exemplary objectives and/or advantages of the invention, and the manner in which the same are accomplished, are further explained within the following detailed description and its accompanying drawings.

DETAILED DESCRIPTION

In one aspect, the present invention embraces an improved, dry optical-fiber cable.

Figure 1:
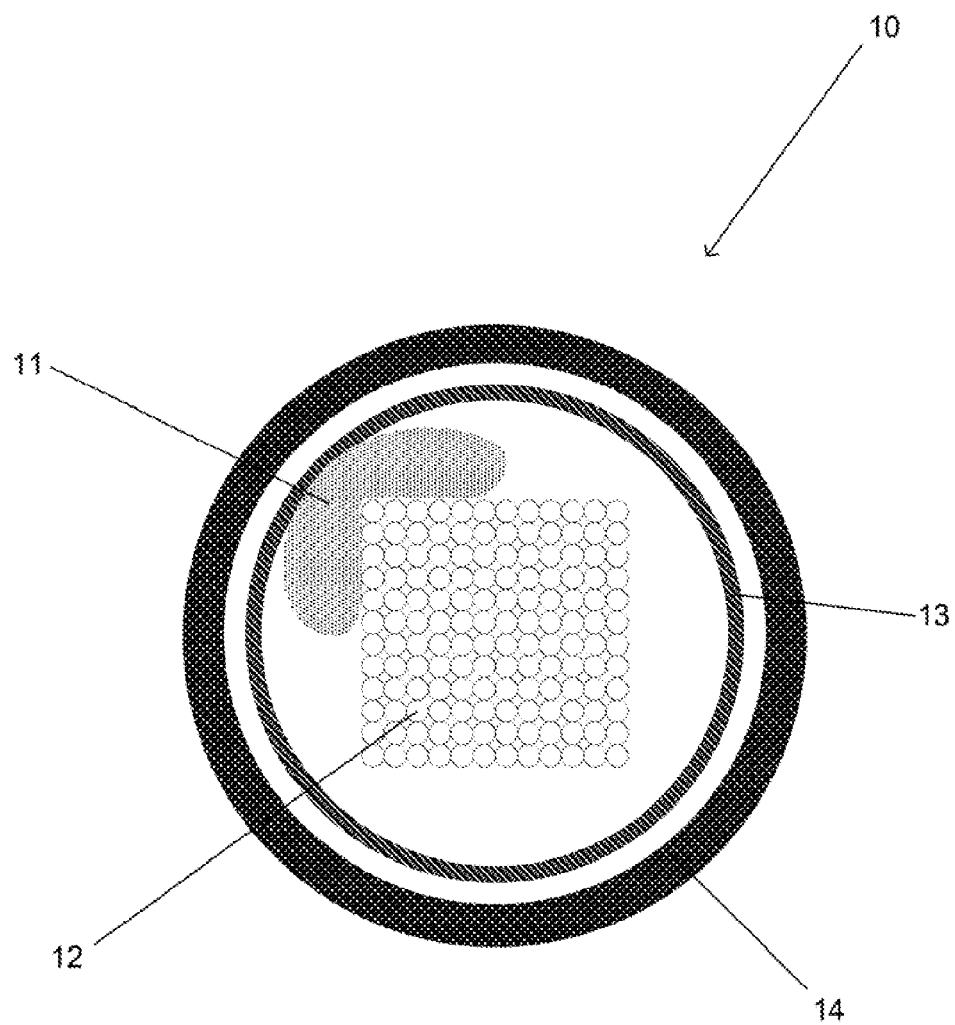
FIG. 1 schematically depicts a cross-sectional view of an exemplary optical-fiber buffer tube according to the present invention.

FIG. 1 schematically depicts a buffer-tube structure 10 having an adhesive 11 coupling one or more optical fibers 12 (e.g., an optical-fiber bundle or an optical-fiber ribbon stack) to an enclosing tape 13 (e.g., a porous water-swellable tape). The enclosing tape 13 at least partially encloses the optical fibers 12 and typically substantially encloses the optical fibers 12.

As depicted in FIG. 1, a polymeric tube 14 (e.g., buffer tube) typically surrounds the tape. That said, the present invention embraces tubeless cable designs, in which the cable's outer protective jacket (i.e., sheath) surrounds the enclosing tape 13 and the optical fibers 12 with no intermediate buffer tube located between the enclosing tape 13 and the cable jacket.

The buffer tube 10 is typically dry and therefore substantially free of thixotropic filling greases. Moreover, optical-fiber cables in accordance with the present invention are typically dry (i.e., grease free).

Typically, the adhesive 11 is formed from a two-part silicone, such as a room temperature vulcanizing (RTV) silicone. An exemplary two-part silicone is Silbione® RTV-4410 A/B, which is commercially available from Bluestar Silicones USA Corporation. Alternatively, other kinds of silicone adhesive, such as one-part curable silicones, may be employed. Silicone-based adhesives are advantageous because they have desirable properties (e.g., hardness, elasticity, and strength) at both high temperatures (e.g., about 85° C.) and low temperatures (e.g., about −40° C.). That said, non-silicone adhesives having similar properties are within the scope of the present invention.

In order to couple the optical fibers to the enclosing tape, the adhesive, typically in a substantially uncured state, may be applied onto the inner surface of the tape or onto the optical fibers. Typically, the adhesive is applied as a plurality of discrete deposits of adhesive material (e.g., intermittent beads). In this regard, each discrete deposit (e.g., discrete domains) of adhesive material may include between about 0.5 $cm^3$ and 5 $cm^3$ of adhesive, typically between about 1 $cm^3$ and 2 $cm^3$ (e.g., about 1.2 $cm^3$) of adhesive. Alternatively, the adhesive may be applied continuously. It is within the scope of the present invention to employ an enclosing tape manufactured to include adhesive material.

Relatively small amounts of adhesive may be sufficient to adequately couple the optical fibers to the enclosing tape. Accordingly, adjacent discrete deposits of adhesive material may be positioned about 5 meters to 10 meters apart (e.g., 1.2 $cm^3$ deposits of adhesive positioned about seven meters apart). In other exemplary embodiments, smaller discrete deposits (e.g., having about 0.2 $cm^3$ of adhesive material) may be positioned closer together (e.g., about one meter apart).

Therefore, cables and buffer tubes in accordance with the present invention may have relatively low adhesive filling coefficients.

As used herein, the term "cable adhesive filling coefficient" refers to the ratio of (i) the volume of the adhesive material between optical fiber(s) (e.g., an optical-fiber bundle or optical-fiber ribbon stack) and the nearest surrounding, protective enclosure (e.g., a buffer tube or a polymeric cable sheath for tubeless cables, but specifically not the enclosing tape) to (ii) the inner volume of the optical-fiber cable (i.e., defined by the inner boundary of the cable's protective outer jacket or sheath).

Furthermore, as used herein, the term "buffer-tube adhesive filling coefficient" refers to the ratio of (i) the volume of the adhesive material between optical fiber(s) and a surrounding buffer tube (e.g., used for coupling an enclosing tape to the buffer tube) to (ii) the inner volume of the buffer tube (i.e., defined by the inner boundary of the buffer tube). Optical-fiber cables that include a plurality of buffer tubes define an "average buffer-tube adhesive filling coefficient," which is an average of the respective buffer-tube adhesive filling coefficients.

The adhesive filling coefficient of cables and buffer tubes excludes material (e.g., encapsulant) used to form optical-fiber ribbon by bonding multiple optical fibers together.

The cable adhesive filling coefficient is typically measured using a 100-meter cable sample. Similarly, the buffer-tube adhesive filling coefficient is typically measured using a 100-meter buffer-tube sample. That said, adhesive filling coefficients may be measured using various sample lengths (e.g., 25 meters, 50 meters, 500 meters, 1000 meters, etc.).

Buffer tubes in accordance with the present invention may have a buffer-tube adhesive filling coefficient of less than about 0.05 (i.e., less than about 5 percent). Typically, the buffer-tube adhesive filling coefficient is between about 0.001 and 0.01, more typically between about 0.0015 and 0.005 (e.g., between about 0.002 and 0.003).

Optical-fiber cables in accordance with the present invention may have a cable adhesive filling coefficient of less than about 0.05, typically less than about 0.01. More typically, the cable adhesive filling coefficient is between about 0.0005 and 0.005, such as between about 0.0015 and 0.0025 (e.g., about 0.002).

After the adhesive is applied (e.g., to the optical fibers and/or to the tape), the tape (e.g., enclosing tape) is typically wrapped (e.g., helically wrapped) around the optical fibers so that the tape at least partially encloses the optical fibers. The adhesive (e.g., a substantially uncured adhesive) typically seeps into (i.e., penetrates) the tape to facilitate coupling between the optical fibers and the tape. For example, the seepage of adhesive into the tape promotes mechanical coupling between the adhesive and the tape. The enclosing tape typically includes perforations, which facilitate the seepage of uncured adhesive into the tape.

Figure 2:
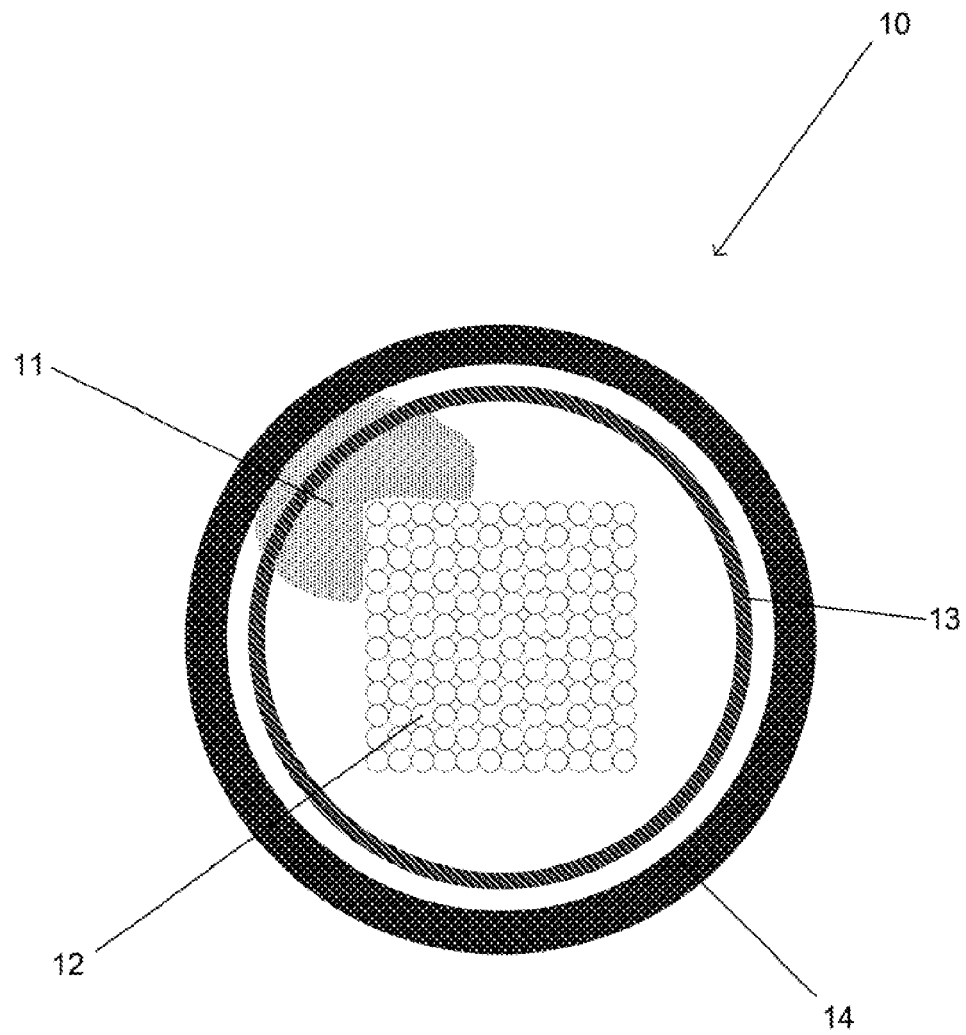
FIG. 2 schematically depicts a cross-sectional view of an exemplary optical-fiber buffer tube according to another embodiment of the present invention.

In one embodiment depicted in FIG. 2, a portion of the adhesive 11 may seep entirely through the enclosing tape 13 (e.g., through perforations) and onto the surface of the buffer tube 14. Accordingly, the adhesive 11 can be used to couple the enclosing tape 13 to the buffer tube 14. In the case of tubeless optical-fiber cables, the adhesive may couple the tape to the cable jacket.

In another embodiment, mechanical coupling helps to secure the enclosing tape 13 to the buffer tube 14. For example, fibrils from the enclosing tape 13 may become embedded in the inner wall of the buffer tube 14, thereby providing mechanical coupling.

Figure 3:
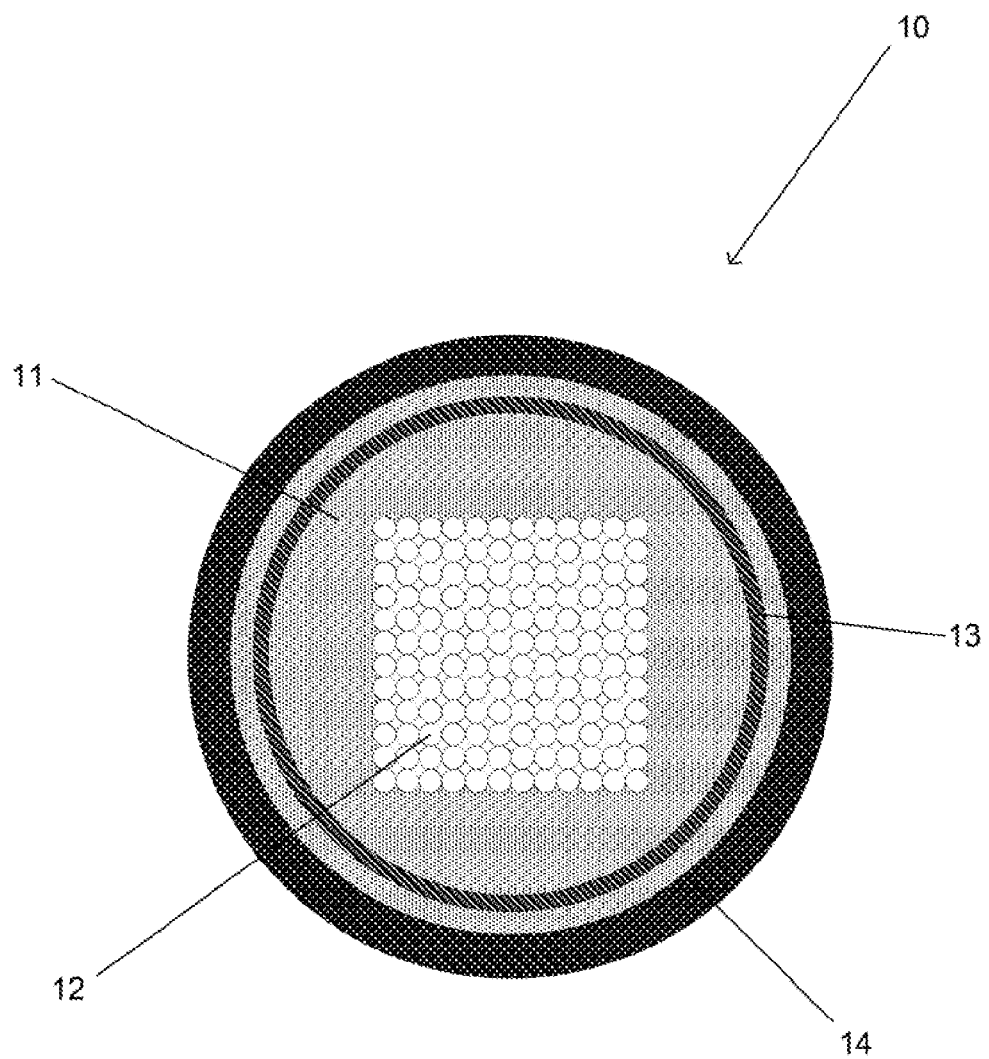
FIG. 3 schematically depicts a cross-sectional view of an exemplary optical-fiber buffer tube according to yet another embodiment of the present invention.

In another embodiment, one or more discrete deposits of adhesive material may include enough adhesive to provide water-blocking functionality to the buffer tube. For example, and as depicted in FIG. 3, at a buffer-tube cross section a discrete deposit of adhesive material 11 may substantially fill the free space within the buffer tube 14 (e.g., the free space between the buffer tube 14 and the enclosing tape 13 and the free space between the enclosing tape 13 and the optical fibers 12), thereby preventing the flow of water that may have penetrated the buffer tube 14. In one embodiment, a discrete deposit of adhesive material may substantially fill the free space within a 10-centimeter portion of a buffer tube.

The viscosity of the uncured adhesive (e.g., a substantially uncured adhesive) is typically low enough so that the uncured adhesive readily penetrates the tape, but high enough so the uncured adhesive does not simply flow off the tape or optical fibers after it is applied. In this regard, the substantially uncured adhesive typically has a viscosity at application (i.e., when the adhesive is applied to the enclosing tape or optical fibers) of between about 500 centipoise (cP) and 5000 centipoise (e.g., between about 1000 centipoise and 4000 centipoise). More typically, the uncured adhesive has a viscosity at application of between about 2000 centipoise and 3000 centipoise (e.g., about 2500 centipoise).

After the adhesive is applied, the enclosing tape and the optical fibers are usually pulled through an extruder crosshead, which forms a molten polymeric tube around the tape and optical fibers. The molten polymeric tube may then be submerged in a water-filled cooling vat that solidifies the polymeric tube, thereby forming a buffer tube. Because the polymeric tube shrinks as it solidifies, the adhesive is typically selected so that it does not finish curing until after the polymeric tube solidifies (e.g., after the buffer tube is wound on its takeup reel). The adhesive typically cures in less than two hours, more typically less than about one hour (e.g., about 10-20 minutes at room temperature).

The adhesive (e.g., a curable silicone adhesive) is also typically selected so that it does not release an undesirable amount of hydrogen as it cures. Those of ordinary skill in the art will appreciate that the presence of hydrogen can lead to undesirable attenuation in optical fibers.

After curing, the adhesive forms a relatively soft solid material, which helps to prevent unwanted optical attenuation. Typically, the cured adhesive has a Shore A hardness of less than about 50. More typically, the cured adhesive has a Shore A hardness of between about 1 and 20 (e.g., a Shore A hardness of about 10).

The present optical fiber cables and buffer tubes typically comply with the Verizon Technical Purchasing Requirements VZ.TPR.9430 (Issue 4, April 2010). The Verizon Technical Purchasing Requirements VZ.TPR.9430 (Issue 4, April 2010), which is incorporated by reference in its entirety, is provided as Appendix I in priority U.S. Patent Application No. 61/364,659.

Optical-fiber cables in accordance with the present invention may be tested in accordance with the "Ribbon Pullout Test Procedure" as set forth in the Verizon Technical Purchasing Requirements VZ.TPR.9430 (Issue 4, April 2010). In accordance with the Ribbon Pullout Test Procedure, the optical-fiber pullout force for the present optical-fiber cables is typically at least 0.1625 N/fiber.

For example, the pullout force for a 12×12 ribbon stack (i.e., containing 144 optical fibers) should be at least 23.4 N in order to satisfy the Ribbon Pullout Test Procedure. In this regard, a central-tube cable, containing 144 optical fibers arranged in a 12×12 ribbon stack, had an optical-fiber pullout force of at least 0.1625 N/fiber. The optical fibers were contained within a central buffer tube having an outer diameter of 9.14 millimeters and an inner diameter of 7.1 millimeters. Discrete deposits of about 1.2 cm$^3$ of adhesive positioned seven meters apart were used to couple the optical-fiber ribbon stack to an enclosing. Therefore, the central buffer tube had a buffer-tube adhesive filling coefficient of 0.0043. The central-tube cable had an outer diameter of 16 millimeters and an inner diameter of 10.42 millimeters and, as such, had a cable adhesive filling coefficient of 0.002.

Accordingly, the small amounts of adhesive described herein (e.g., a buffer-tube adhesive filling coefficient of about 0.0025) are typically sufficient to couple (e.g., bond) the optical fibers to the enclosing tape without requiring frictional coupling. For example, the adhesive typically resists the movement of the optical fibers relative to the enclosing tape without requiring the application of an external compressive force upon the tape. Similarly, the adhesive may be sufficient to couple (e.g., bond) the enclosing tape to the surrounding buffer tube or cable jacket without requiring frictional coupling.

* * *

The enclosing tape is typically a water-swellable tape, such as a tape including super absorbent polymers (SAPs) (e.g., SAP powder). Exemplary, water-swellable tapes are disclosed in U.S. Pat. Nos. 4,909,592, 6,284,367, 6,899,776, 7,231,119, and 7,515,795. Exemplary, water-swellable tapes are also disclosed in commonly assigned U.S. Patent Application Publication No. 2010/0166375 and in commonly assigned U.S. patent application Ser. No. 13/009,118 for a Water-Soluble Water-Blocking Element, filed Jan. 19, 2011, (Parris). That said, tapes that do not employ water-swellable material (e.g., polymeric coupling tapes) are within the scope of the present invention. Exemplary coupling tapes are disclosed in U.S. Pat. No. 7,639,915 for an Optical Fiber Cable Having a Deformable Coupling Element (Parris et al.) and U.S. Pat. No. 7,646,952 for an Optical Fiber Cable Having Raised Coupling Supports (Parris). Each of the foregoing patents and patent applications is hereby incorporated by reference in its entirety.

Figure 4:
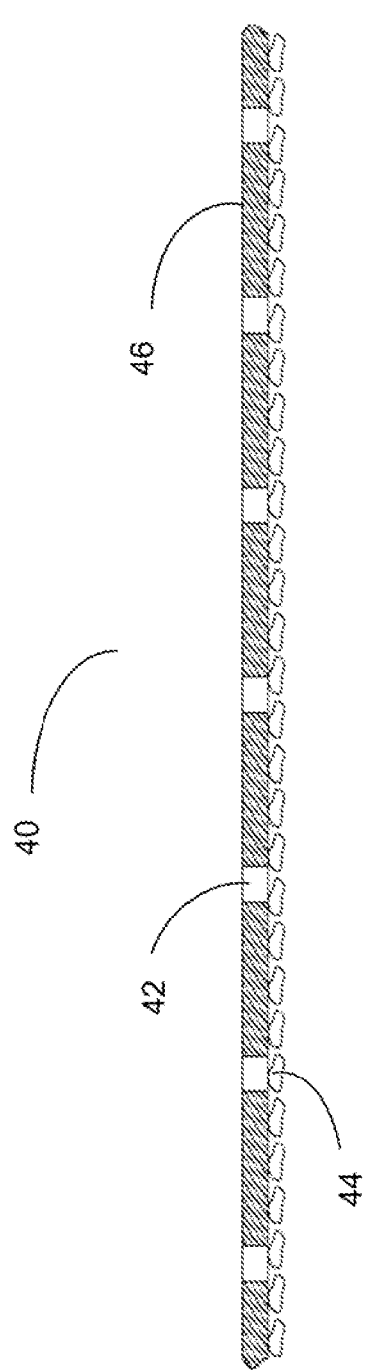
FIG. 4 schematically depicts a cross-sectional view of a two-layer water-swellable tape in which water-swellable powder is bonded to a perforated carrier tape.
Figure 5:
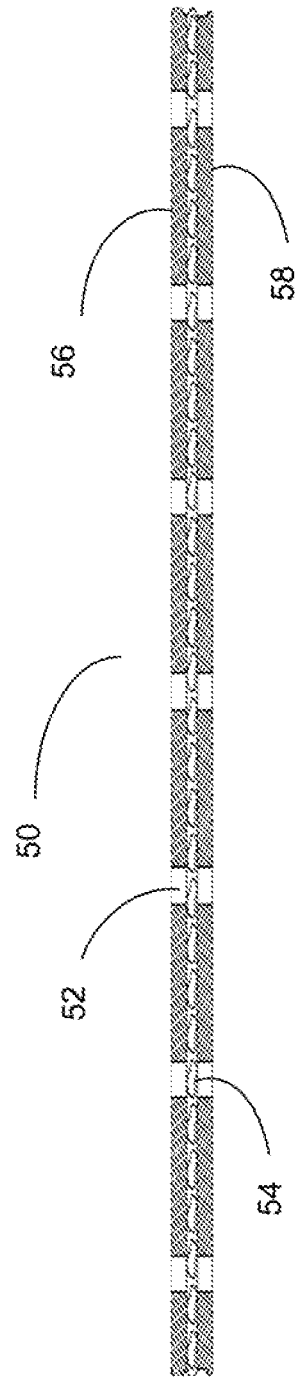
FIG. 5 schematically depicts a cross-sectional view of a three-layer water-swellable tape in which water-swellable powder is disposed between two perforated carrier tapes.

In a typical embodiment depicted in FIG. 4, a water-swellable tape 40 has a two-layer structure having water-swellable particulate powder 44 bonded to a carrier tape 46 having a plurality of perforations 42. Alternatively, FIG. 5 depicts a water-swellable tape 50 employing a three-layer structure having water-swellable particulate powder 54 bonded between two carrier tapes 56 and 58, which typically have a plurality of perforations 52. The carrier tape may be perforated to facilitate the transport of water toward the water-swellable particulate power and the transport of uncured adhesive into the water-swellable tape. In this regard, although the perforations are typically holes, other profiles, such as slits or flaps, are within the scope of the present invention. The perforations should be large enough to allow uncured adhesive to seep through such openings.

The carrier tape may be coated with a wetting agent (e.g., a surfactant) that promotes the transport of intruding water toward the water-swellable particulate powder. For example, a surfactant may reduce the surface tension of at least a portion of the carrier tape so that water can easily move through a perforation toward the water-swellable particulate powder. A surfactant may also be used to promote the flow of uncured adhesive.

The carrier tape, typically a relatively smooth carrier tape, can be formed from either (i) non fibrous films or sheets or (ii) fibrous fabrics or webs (e.g., nonwovens). In exemplary embodiments, the tape may be a polyester film, such as MYLAR® film, a polyolefin tape (e.g., polypropylene or polyethylene), or a fire-resistant polyimide film (e.g., KAPTON® film).

In other exemplary embodiments, fibrous, fabric (e.g., knit, woven, or nonwoven) carrier tapes may be employed, such as a substrate made from synthetic polymeric fibers (e.g., polyester or polyolefin fibers) or natural fibers (e.g., cellulose). By way of example, cellulosic nonwovens, such as paper (e.g., parchment paper), may be employed as a carrier tape. Fibrous tapes can be surficially rough, however, so selecting a suitable, smooth carrier tape should be made with due consideration. To ensure a smooth surface, fibrous (and non-fibrous) tapes may be treated with a surface coating formulation (e.g., to achieve a coated paper tape) or otherwise enhanced with a thin, smooth film (e.g., a polymeric surface film).

As will be understood by those having ordinary skill in the art, fibrous carrier tapes possess discrete perforations (and inherent interstices) of sufficient size and number to promote water transport and the transport of uncured adhesive. In this regard, the inherent interstices of the fibrous carrier tapes (i.e., spaces between fibers) occur intrinsically during formation of the fibrous substrate, whereas the larger, discrete perforations are formed in a secondary process (i.e., to achieve the desired distribution of openings).

In yet another embodiment, a water-soluble carrier tape may be employed. Exemplary water-soluble carrier tapes may include water-soluble polymers such as methyl cellulose, ethyl cellulose, hydroxyethyl cellulose, latex powders, cellulose ethers, and polyvinyl alcohol. That said, it is within the scope of the present invention for the water-soluble carrier tape to include some insoluble materials. For example, the water-soluble carrier tape may include a strength-enhancing fibrous material (e.g., wood pulp) for improving the strength of the carrier tape.

The carrier tape(s) typically have a thickness of between about 0.05 millimeter and 0.5 millimeter, more typically between about 0.2 millimeter and 0.4 millimeter (e.g., about 0.25 millimeter). In this regard and in contrast to conventional foam inserts, the carrier tapes are somewhat resistant to compression (e.g., less bulky). Such reduced bulk permits the dimensions of the fiber optic cable to be reduced or, alternatively, provides more free space for the optical fibers within the buffer tube.

In this regard, the carrier tapes described herein typically resist significant compression, such as that which occurs in foams having density reductions of 30 percent or more. By way of example, a water-swellable tape may employ a carrier tape with a density of at least about 0.25 g/cm$^3$ (e.g., between about 0.50 g/cm$^3$ and 0.80 g/cm$^3$). In some embodiments, the carrier tape may have a density of at least about 0.90 g/cm$^3$ (e.g., between about 1.0 g/cm$^3$ and 1.5 g/cm$^3$ or more). In other particular embodiments, the carrier tapes may possess only negligible compression properties (i.e., the carrier tape is substantially incompressible).

Furthermore, the carrier tape described herein may possess a Shore A hardness of more than about 25 (e.g., 30-40), typically more than about 45 (e.g., 50-60). For example, the carrier tape described herein may possess a Shore A hardness of more than about 65 (e.g., 70-80 or more).

Exemplary water-swellable materials for use with the water-swellable tapes described herein include a matrix (e.g., ethylene vinyl acetate or rubber) enhanced with about 30 to 70 weight percent super absorbent polymers (SAPs), such as particulates of sodium polyacrylate, polyacrylate salt, or acrylic acid polymer with sodium salt. Such water-swellable materials can be processed on conventional hot melt adhesive machinery. The water-swellable particulate powders typically possess a particle size weight distribution in which the median particle diameter is less than about 500 microns, more typically between about 10 and 300 microns. Even more typically, the water-swellable particulate powders have a median particle diameter of less than about 150 microns (e.g., less than about 50 microns).

The perforations in the carrier tape may be sized to obstruct the migration of the dry water-swellable powder through the perforations of the carrier tape (i.e., hinder dry migration of the powder). That said, because the water-swellable particulate powders are typically bonded (e.g., with an adhesive) to a perforated carrier tape, the perforations need not be smaller (e.g., have a smaller diameter) than the water-swellable particulate powders to preclude complete or partial passing of the particulate powders through the perforations. In view of the foregoing and by way of illustration, the perforations typically have a diameter of between about 0.1 millimeter and about ten millimeters (e.g., between about 0.5 millimeter and about two millimeters, such as about one millimeter).

The water-swellable tape is typically oriented within the buffer tube so that a carrier tape is positioned between the optical fiber(s) and the water-swellable particulate powder. By positioning a carrier tape between the optical fiber(s) and the water-swellable particulate powder, contact between dry (e.g., inactivated) water-swellable particulate powder and the optical fiber(s) can be avoided. In other words, a carrier tape acts as a barrier between the inactivated water-swellable particulate powder and the optical fibers.

Inhibiting contact between dry water-swellable particulate powder and the optical fiber(s) is desirable because contact between the optical fiber(s) and the dry water-swellable particulate powder (e.g., before its activation) could cause microbending in the optical fibers.

Figure 6:
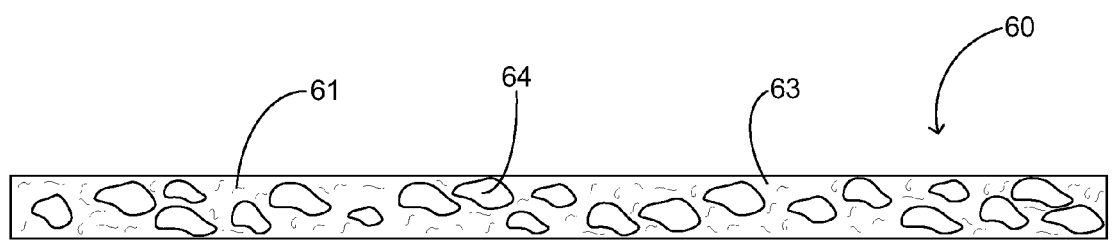
FIG. 6 schematically depicts a cross-sectional view of a composite water-swellable tape.

In an alternative embodiment, the water-swellable tape may be formed as a composite of water-swellable material, fibers, and a water-soluble binder. As depicted in FIG. 6, the water-swellable tape 60 includes water-swellable particulate powder 64 (e.g., SAP powder) and strength-enhancing fibers 61 (e.g., wood pulp) held together with (e.g., embedded within) a water-soluble binder 63, such as a polymeric resin (e.g., methyl cellulose resin). Alternative water-soluble binders include polyvinyl alcohol, hydroxyethyl cellulose, ethyl cellulose, cellulose ethers, and latex.

In the presence of water, the water-soluble binder will dissolve thereby facilitating the transport of water toward the water-swellable particulate powder.

The strength-enhancing fibers within the composite water-swellable tape help to ensure that the composite water-swellable tape has sufficient strength and structural integrity in the absence of water. In this regard, the composite water-swellable tape typically has a longitudinal break strength of at least about 5 grams per millimeter of width (e.g., at least 10 grams per millimeter of width) under dry conditions (e.g., in the absence of water).

The composite water-swellable tape typically has a thickness of less than about one millimeter, more typically less than about 0.5 millimeter (e.g., between about 0.1 millimeter and about 0.25 millimeter). That said, the composite water-swellable tape typically is at least as thick as the largest dry water-swellable particle contained with the water-swellable particulate powder. In this way, the structure of the composite water-swellable tape inhibits the dry water-swellable particulate powder from directly contacting any optical fibers when the composite water-swellable tape is positioned within a buffer tube. Therefore, undesirable optical-fiber attenuation can be avoided. In addition, the composite water-swellable tape typically has a smooth surface (e.g., a surface adjacent to any optical fibers, typically the surface between the water-swellable tape and any optical fibers) to further facilitate a reduction in optical-fiber attenuation.

In contrast to conventional foam inserts, the composite water-swellable tape is somewhat resistant to compression. In other words, the carrier tapes of the present invention resist significant compression, such as that which occurs in foams having density reductions of 30 percent or more. In an exemplary embodiment, the composite water-swellable tape has a density of at least about 0.25 g/cm$^3$ (e.g., between about 0.50 g/cm$^3$ and 0.80 g/cm$^3$). By way of further example, the water-swellable tape may have a density of at least about 0.90 g/cm$^3$ (e.g., between about 1.0 g/cm$^3$ and 1.5 g/cm$^3$ or more). In some embodiments, the composite water-swellable tape may be substantially incompressible (e.g., under dry conditions). Such reduced bulk (and increased density) permits the dimensions of an optical-fiber cable containing the composite water-swellable tape to be reduced or, alternatively, provides more free space for the optical fibers within a buffer tube.

The foregoing notwithstanding, the composite water-swellable tape may substantially expand in the presence of water. By way of example, a water-swellable tape, having a thickness of about 0.5 millimeter under dry conditions, may expand to have a thickness of at least about 8 millimeters after being exposed to distilled water for about one minute.

The tape is typically disposed within a buffer tube in such a way as to surround the optical fiber(s). The width of the tape is typically the same as the inner circumference of the buffer tube. In some embodiments, however, the width of the tape is at least about ten percent greater than the buffer tube's inner circumference.

Optical-fiber cables and buffer tubes in accordance with the present invention may contain conventional glass fibers or bend-insensitive glass fibers. An exemplary bend-insensitive glass fiber for use in the present invention is disclosed in U.S. Pat. No. 7,623,747 for a Single Mode Optical Fiber.

With respect to conventional and bend-insensitive optical fibers (e.g., a single-mode optical fiber or a multimode optical fiber), the component glass fiber typically has an outer diameter of about 125 microns. With respect to an optical fiber's surrounding coating layers, the primary coating typically has an outer diameter of between about 175 microns and about 195 microns (i.e., a primary coating thickness of between about 25 microns and 35 microns), and the secondary coating typically has an outer diameter of between about 235 microns and about 265 microns (i.e., a secondary coating thickness of between about 20 microns and 45 microns). Optionally, the optical fiber may include an outermost ink layer, which is typically between two and ten microns in thickness.

In one alternative embodiment, an optical fiber may possess a reduced diameter (e.g., an outermost diameter between about 150 microns and 230 microns). In this alternative optical-fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

By way of illustration, in such exemplary embodiments the primary coating layer may have an outer diameter of between about 135 microns and about 175 microns (e.g., about 160 microns), typically less than 165 microns (e.g., between about 135 microns and 150 microns) and usually more than 140 microns (e.g., between about 145 microns and 155 microns, such as about 150 microns).

Moreover, in such exemplary embodiments the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns). By way of further illustration, an optical fiber may employ a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced thickness secondary coating of between 15 microns and 25 microns).

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

Reducing the diameter of the component glass fiber might make the resulting optical fiber more susceptible to microbending attenuation. That said, the advantages of further reducing optical-fiber diameter may be worthwhile for some optical-fiber applications.

As noted, optical fibers contained within buffer tubes and cables in accordance with the present invention typically include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

Such fibers may include a low-modulus primary coating to reduce the risk of microbending. A low-modulus primary coating may be combined with bend-insensitive fiber to provide unexpectedly superior reductions in microbend sensitivity.

Multiple optical fibers may be sandwiched, encapsulated, and/or edge bonded to form an optical-fiber ribbon. Optical-fiber ribbons can be divisible into subunits (e.g., a twelve-fiber ribbon that is splittable into six-fiber subunits). Moreover, a plurality of such optical-fiber ribbons may be aggregated to form a ribbon stack, which can have various sizes and shapes.

For example, it is possible to form a rectangular ribbon stack or a ribbon stack in which the uppermost and lowermost optical-fiber ribbons have fewer optical fibers than those toward the center of the stack. This construction may be useful to increase the density of optical elements (e.g., optical fibers) within the buffer tube and/or cable.

In general, it is desirable to increase the filling (e.g., density) of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary coating thickness and/or modulus, to improve microbending and macrobending characteristics.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

The buffer tube may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer. In this context, the buffer tube may be extruded (e.g., an extruded polymeric material). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Exemplary buffer tubes may have an inner diameter of between about three millimeters and 15 millimeters (e.g., five to ten millimeters), typically between about seven millimeters and 12 millimeters. Table 1 (below) depicts exemplary buffer tube dimensions.

TABLE 1

(Buffer Tube Dimensions)

| | Ex. 1 | Ex. 2 | Ex. 3 | Ex. 4 |
|---|---|---|---|---|
| Number of Optical Fibers | 12-48 | 60-144 | 156-216 | 288-432 |
| Buffer Tube Outer Diameter (mm) | 6.48 | 9.14 | 11.68 | 14.48 |
| Buffer Tube Inner Diameter (mm) | 5.2 | 7.1 | 9.14 | 11.68 |

A plurality of buffer tubes containing optical fibers (e.g., loose or ribbonized fibers) may be positioned externally adjacent to and stranded around a central strength member. This stranding can be accomplished in one direction, helically, known as "S" or "Z" stranding, or Reverse Oscillated Lay stranding, known as "S-Z" stranding. Stranding about the central strength member reduces optical-fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, optical fibers and tape described herein may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). Likewise, strength members can be included within the buffer tube's casing. Table 2 (below) depicts exemplary central-tube cable in accordance with the present invention.

TABLE 2

(Central-Tube Cable Dimensions)

| | Buffer Tube OD (mm) | Cable OD (mm) | Cable ID (mm) | Weight (kg/km) | Copper Wires Embedded in Cable Jacket | Armored |
|---|---|---|---|---|---|---|
| Ex. 1 | 6.48 | 14.63 | 9.65 | 184 | No | Yes |
| Ex. 2 | 9.14 | 17.02 | 12.04 | 228 | No | Yes |
| Ex. 3 | 11.68 | 19.56 | 14.58 | 284 | No | Yes |
| Ex. 4 | 6.48 | 13.46 | 7.88 | 122 | No | No |
| Ex. 5 | 9.14 | 16 | 10.42 | 176 | No | No |
| Ex. 6 | 11.68 | 18.41 | 12.83 | 219 | No | No |
| Ex. 7 | 6.48 | 13.97 | 7.87 | 147 | Yes | No |
| Ex. 8 | 9.14 | 16.51 | 10.41 | 201 | Yes | No |
| Ex. 9 | 11.68 | 18.92 | 12.82 | 244 | Yes | No |
| Ex. 10 | | 20.12 | 14.54 | 230 | No | No |
| Ex. 11 | | 20.62 | 14.52 | 255 | Yes | No |
| Ex. 12 | | 22.15 | 17.17 | 324 | No | Yes |

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may tightly or loosely surround the stranded buffer tubes.

Additional elements may be included within an optical-fiber cable. For example, copper cables or other active, transmission elements may be stranded or otherwise bundled within the cable sheath. Passive elements may also be placed within the cable, such as between the interior walls of the buffer tubes and the enclosed optical fibers. Alternatively and by way of example, passive elements may be placed outside the buffer tubes between the respective exterior walls of the buffer tubes and the interior wall of the cable jacket, or within the interior space of a buffer-tube-free cable.

An optical-fiber cable may have a sheath (i.e., outer jacket) formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape along with one or more dielectric jackets may form the cable sheathing. Metallic or fiberglass reinforcing rods (e.g., GRP) may also be incorporated into the sheath. Copper wires (e.g., two copper wires) may be embedded within the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical-fiber cable sheaths typically have a circular cross section, but cable sheaths alternatively may have an irregular or non-circular shape (e.g., an oval, trapezoidal, or flat cross section).

A strength member is typically in the form of a rod or braided/helically wound wires or fibers, though other configurations will be within the knowledge of those having ordinary skill in the art.

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. Patent Application Publication No. US2011/0044595 A1 for a Transmission Optical Fiber Having Large Effective Area (Sillard et al.); International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Pat. No. 7,889,960 for a Bend-Insensitive Single-Mode Optical Fiber, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Patent Application Publication No. US2010/0028020 A1 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burov et al.); U.S. Patent Application Publication No. US2010/0254653 A1 for a Multimode Fiber, filed Apr. 22, 2010, (Molin et al.); U.S. Patent Application Publication No. US2010/0310218 A1 for a Large Bandwidth Multimode Optical Fiber Having a Reduced Cladding Effect, filed Jun. 4, 2010, (Molin et al.); U.S. Patent Application Publication No. US2011/0058781 A1 for a Multimode Optical Fiber Having Improved Bending Losses, filed Sep. 9, 2010, (Molin et al.); U.S. Patent Application Publication No. US2011/0064367 A1 for a Multimode Optical Fiber, filed Sep. 17, 2010, (Molin et al.); U.S. Patent Application Publication No. US2011/0069724 A1 for an Optical Fiber for Sum-Frequency Generation, filed Sep. 22, 2010, (Richard et al.); U.S. Patent Publication No. US2011/0116160 A1 for a Rare-Earth-Doped Optical Fiber Having Small Numerical Aperture, filed Nov. 11, 2010, (Boivin et al.); U.S. Patent Publication No. US2011/0123161 A1 for a High-Bandwidth, Multimode Optical Fiber with Reduced Cladding Effect, filed Nov. 24, 2010, (Molin et al.); U.S. Patent Publication No. US2011/0123162 A1 for a High-Bandwidth, Dual-Trench-Assisted Multimode Optical Fiber, filed Nov. 24, 2010, (Molin et al.); U.S. Patent Publication No. US2011/0135262 A1 for a Multimode Optical Fiber with Low Bending Losses and Reduced Cladding Effect, filed Dec. 3, 2010, (Molin et al.); U.S. Patent Publication No. US2011/0135263 A1 for a High-Bandwidth Multimode Optical Fiber Having Reduced Bending Losses, filed Dec. 3, 2010, (Molin et al.); U.S. patent application Ser. No. 13/017,089 for a Non-Zero Dispersion Shifted Optical Fiber Having a Large Effective Area, filed Jan. 31, 2011, (Sillard et al.); U.S. patent application Ser. No. 13/017,092 for a Non-Zero Dispersion Shifted Optical Fiber Having a Short Cutoff Wavelength, filed Jan. 31, 2011, (Sillard et al.); U.S. patent application Ser. No. 13/037,943 for a Broad-Bandwidth Multimode Optical Fiber Having Reduced Bending Losses, filed Mar. 1, 2011, (Bigot-Astruc et al.); U.S. patent application Ser. No. 13/048,028 for a Single-Mode Optical Fiber, filed Mar. 15, 2011, (de Montmorillon et al.); and U.S. patent application Ser. No. 13/175,181 for a Single-Mode Optical Fiber, filed Jul. 1, 2011, (Bigot-Astruc et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Pat. No. 7,974,507 A1 for a High-Fiber-Density Optical Fiber Cable (Lovie et al.); U.S. Pat. No. 7,970,247 for a Buffer Tubes for Mid-Span Storage (Barker); U.S. Patent Application Publication No. US2010/0135623 A1 for Single-Fiber Drop Cables for MDU Deployments, filed Nov. 9, 2009, (Overton); U.S. Patent Application Publication No. US2010/0092140 A1 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Patent Application Publication No. US2010/0135625 A1 for Reduced-Diameter Ribbon Cables with High-Performance Optical Fiber, filed Nov. 10, 2009, (Overton); U.S. Patent Application Publication No. US2010/0092139 A1 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. Patent Application Publication No. US2011/0026889 A1 for a Tight-Buffered Optical Fiber Unit Having Improved Accessibility, filed Jul. 26, 2010, (Risch et al.); U.S. Patent Application Publication No. US2011/0064371 A1 for Methods and Devices for Cable Insertion into Latched Conduit, filed Sep. 14, 2010, (Leatherman et al.); U.S. Patent Publication No. 2011/0069932 A1 for a High-Fiber-Density Optical-Fiber Cable, filed Oct. 19, 2010, (Overton et al.); U.S. Patent Publication No. 2011/0091171 A1 for an Optical-Fiber Cable Having High Fiber Count and High Fiber Density, filed Oct. 19, 2010, (Tatat et al.); U.S. patent application Ser. No. 13/009,118 for a Water-Soluble Water-Blocking Element, filed Jan. 19, 2011, (Parris); U.S. patent application Ser. No. 13/096,178 for a Data-Center Cable, filed Apr. 28, 2011, (Lovie et al.); U.S. patent application Ser. No. 13/099,663 for a Bundled Fiber Optic Cables, filed May 3, 2011, (Quinn et al.); U.S. patent application Ser. No. 13/111,147 for a Curing Apparatus Employing Angled UVLEDs, filed May 19, 2011, (Molin); U.S. patent application Ser. No. 13/116,141 for a Low-Smoke and Flame-Retardant Fiber Optic Cables, filed May 26, 2011, (Lovie et al.); and U.S. patent application Ser. No. 13/152,651 for a Curing Apparatus Having UV Sources That Emit Differing Ranges of UV Radiation, filed Jun. 3, 2011, (Gharbi et al.).

* * *

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An optical-fiber cable, comprising:
one or more optical fibers;
an enclosing tape at least partially enclosing said one or more optical fibers;
a plurality of discrete deposits of adhesive material coupling said enclosing tape to at least one said optical fiber; and
a buffer tube substantially enclosing said one or more optical fibers, said enclosing tape, and said discrete deposits of adhesive material;
wherein said buffer tube has a buffer-tube adhesive filling coefficient of between about 0.001 and 0.05 measured over a buffer-tube length of 100 meters.

2. An optical-fiber cable according to claim 1, wherein:
said one or more optical fibers comprise a ribbon stack; and
the optical-fiber cable has an optical-fiber pullout force of least about 0.1625 N/fiber in accordance with the Ribbon Pullout Test Procedure as set forth in the Verizon Technical Purchasing Requirements VZ.TPR.9430 (Issue 4, April 2010).

3. An optical-fiber cable according to claim 1, wherein said enclosing tape is perforated.

4. An optical-fiber cable according to claim 1, wherein said enclosing tape comprises a water-swellable tape.

5. An optical-fiber cable according to claim 1, wherein at least one of said discrete deposits of adhesive material couples said enclosing tape to said buffer tube.

6. An optical-fiber cable according to claim 1, wherein said discrete deposits of adhesive material couple said enclosing tape to at least one said optical fiber without requiring frictional coupling.

7. An optical-fiber cable according to claim 1, wherein said discrete deposits of adhesive material resist movement of said one or more optical fibers relative to said enclosing tape without requiring the application of an external compressive force upon said enclosing tape.

8. An optical-fiber cable according to claim 1, wherein said discrete deposits of adhesive material comprise a two-part silicone.

9. An optical-fiber cable according to claim 1, wherein:
said buffer tube defines free space therein; and
at a cross section of said buffer tube, at least one of said discrete deposits of adhesive material substantially fills the free space within said buffer tube.

10. An optical-fiber cable according to claim 1, wherein said buffer tube has a buffer-tube adhesive filling coefficient of less than about 0.01 measured over a buffer-tube length of 100 meters.

11. An optical-fiber cable according to claim 1, wherein said buffer tube has a buffer-tube adhesive filling coefficient of between about 0.0015 and 0.005 measured over a buffer-tube length of 100 meters.

12. An optical-fiber cable according to claim 1, wherein said buffer tube has a buffer-tube adhesive filling coefficient of between about 0.002 and 0.003 measured over a buffer-tube length of 100 meters.

13. An optical-fiber cable according to claim 1, wherein said buffer tube is substantially free of thixotropic filling greases.

14. An optical-fiber cable, comprising:
one or more optical fibers;
an enclosing tape at least partially enclosing said one or more optical fibers;
a plurality of discrete deposits of adhesive material coupling said enclosing tape to at least one said optical fiber; and
a cable jacket substantially enclosing said one or more optical fibers, said enclosing tape, and said discrete deposits of adhesive material;
wherein the optical-fiber cable has a cable adhesive filling coefficient of between about 0.0005 and 0.05 measured over a cable length of 100 meters.

15. An optical-fiber cable according to claim 14, wherein:
said one or more optical fibers comprise a ribbon stack; and
the optical-fiber cable has an optical-fiber pullout force of least about 0.1625 N/fiber in accordance with the Ribbon Pullout Test Procedure as set forth in the Verizon Technical Purchasing Requirements VZ.TPR.9430 (Issue 4, April 2010).

16. An optical-fiber cable according to claim 14, wherein said enclosing tape is perforated.

17. An optical-fiber cable according to claim 14, wherein said enclosing tape comprises a water-swellable tape.

18. An optical-fiber cable according to claim 14, wherein at least one of said discrete deposits of adhesive material couples said enclosing tape to said cable jacket.

19. An optical-fiber cable according to claim 14, wherein said discrete deposits of adhesive material couple said enclosing tape to at least one said optical fiber without requiring frictional coupling.

20. An optical-fiber cable according to claim 14, wherein said discrete deposits of adhesive material resist movement of said one or more optical fibers relative to said enclosing tape without requiring the application of an external compressive force upon said enclosing tape.

21. An optical-fiber cable according to claim 14, wherein said discrete deposits of adhesive material comprise a two-part silicone.

22. An optical-fiber cable according to claim 14, wherein the optical-fiber cable has a cable adhesive filling coefficient of less than about 0.005 measured over a cable length of 100 meters.

23. An optical-fiber cable according to claim 14, wherein the optical-fiber cable has a cable adhesive filling coefficient of between about 0.0015 and 0.0025 measured over a cable length of 100 meters.

24. An optical-fiber cable according to claim 14, comprising a buffer tube positioned within said cable jacket, said buffer tube substantially enclosing said one or more optical fibers, said enclosing tape, and said discrete deposits of adhesive material.

25. A method for manufacturing an optical-fiber cable, comprising
applying a substantially uncured adhesive to (i) one or more optical fibers and/or (ii) an enclosing tape, the substantially uncured adhesive having a viscosity at application of between about 500 centipoise and 5000 centipoise;

at least partially enclosing the optical fibers with the enclosing tape;

extruding a molten polymeric tube around the optical fibers and the enclosing tape;

cooling the molten polymeric tube to form a buffer tube or cable jacket; and curing the substantially uncured adhesive;

wherein the substantially uncured adhesive does not finish curing until the molten polymeric tube solidifies.

26. A method according to claim 25, comprising seeping at least a portion of the substantially uncured adhesive entirely through the enclosing tape after the substantially uncured adhesive has been applied and before the substantially uncured adhesive finishes curing.

27. A method according to claim 25, wherein the viscosity at application of the substantially uncured adhesive is between about 1000 centipoise and 4000 centipoise.

28. A method according to claim 25, wherein the viscosity at application of the substantially uncured adhesive is between about 2000 centipoise and 3000 centipoise.

29. A method according to claim 25, wherein the enclosing tape is a perforated water-swellable tape.

\* \* \* \* \*